US008601650B2

(12) United States Patent
Nakagawa (10) Patent No.: US 8,601,650 B2
(45) Date of Patent: Dec. 10, 2013

(54) ATTACHMENT STRUCTURE OF CLIP (75) Inventor: Takayoshi Nakagawa, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 24 days.

(21) Appl. No.: 12/864,027

(22) PCT Filed: Jan. 21, 2009

(86) PCT No.: PCT/JP2009/050886
§ 371 (c)(1),
(2), (4) Date: Jul. 22, 2010

(87) PCT Pub. No.: WO2009/093614
PCT Pub. Date: Jul. 30, 2009

(65) Prior Publication Data
US 2010/0293762 A1    Nov. 25, 2010

(30) Foreign Application Priority Data

Jan. 23, 2008   (JP) ................................ 2008-013064

(51) Int. Cl.
*F16B 2/20*   (2006.01)
(52) U.S. Cl.
USPC ............... 24/458; 24/289; 24/297; 24/581.11
(58) Field of Classification Search
USPC ................. 24/289, 297, 458, 581.11
See application file for complete search history.

(56) References Cited

U.S. PATENT DOCUMENTS

| 2,946,612 | A | * | 7/1960 | Ahlgren | ........................... 292/17 |
| 3,776,580 | A | * | 12/1973 | James | ........................... 292/17 |
| 3,909,883 | A | * | 10/1975 | Fegen | ........................ 174/138 D |
| 3,988,808 | A | * | 11/1976 | Poe et al. | ........................ 24/326 |
| 5,724,709 | A | * | 3/1998 | Kittmann et al. | ................ 24/453 |
| 7,036,779 | B2 | * | 5/2006 | Kawaguchi et al. | ..... 248/220.31 |

FOREIGN PATENT DOCUMENTS

| JP | 53-133413 | B2 | 10/1978 |
| JP | 60-057826 | U | 4/1985 |
| JP | 5-044713 | A | 2/1993 |
| JP | 5-164114 | A | 6/1993 |
| JP | 7-208413 | A | 8/1995 |
| JP | 2005-042770 | A | 2/2005 |
| JP | 2006-183704 | A | 7/2006 |
| JP | 2007-255610 | A | 10/2007 |

OTHER PUBLICATIONS

International Search Report (PCT/ISA/210) for PCT/JP2009/050886, dated May 12, 2009.
IPER (PCT/ISA/237) for PCT/JP2009/050886, dated May 12, 2009.

\* cited by examiner

*Primary Examiner* — Robert J Sandy
*Assistant Examiner* — David Upchurch
(74) *Attorney, Agent, or Firm* — Sughrue Mion, PLLC (57) ABSTRACT

An attachment structure for a clip including a mounting member, a retaining hole formed in the mounting member, and a rib. An elastic retaining piece of the clip, while elastically deformed, is inserted into the retaining hole from an outer side of the mounting member toward an inner side to be retained therein. The rib is disposed around the retaining hole and is formed integrally with the mounting member. The rib includes a first rib formed on the inner side of the mounting member and a second rib formed outside, and concentric to, the first rib. The first rib has a thickness such that a clip press-contacting piece abuts the outer side of the mounting member when the elastic retaining piece is inserted in the retaining hole and retained on the rib, and the second rib has a thickness larger than the thickness of the first rib.

2 Claims, 9 Drawing Sheets

PRIOR ART

Fig. 7

PRIOR ART

Fig. 8

PRIOR ART

Fig. 9

PRIOR ART

ATTACHMENT STRUCTURE OF CLIP

TECHNICAL FIELD

The present invention relates to an attachment structure of a clip having elastic retaining pieces. More particularly, the present invention relates to the attachment structure of the clip which the elastic retaining pieces are fit in a retaining hole in a wall body of a mounting member or others so as to be attached stably.

BACKGROUND ART

Figure 6:
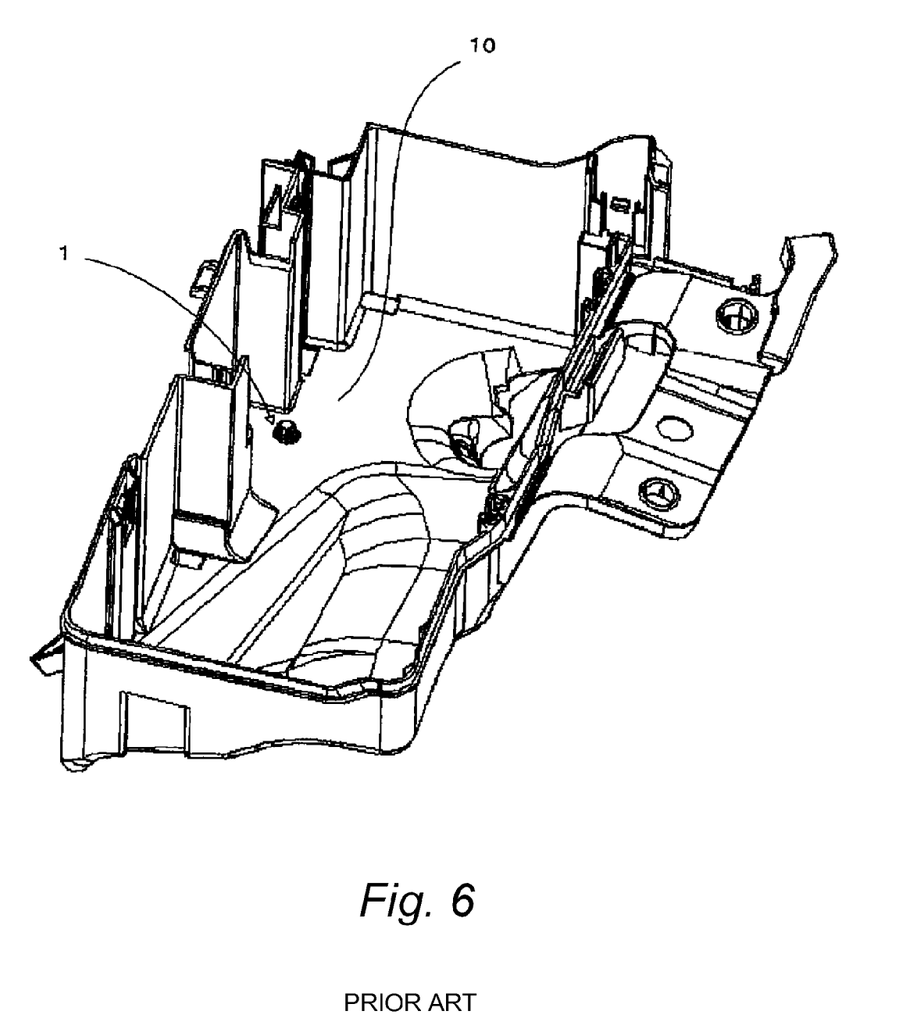
FIG. 6 is a perspective view showing an example of a conventional attachment structure of a clip.
Figure 7:
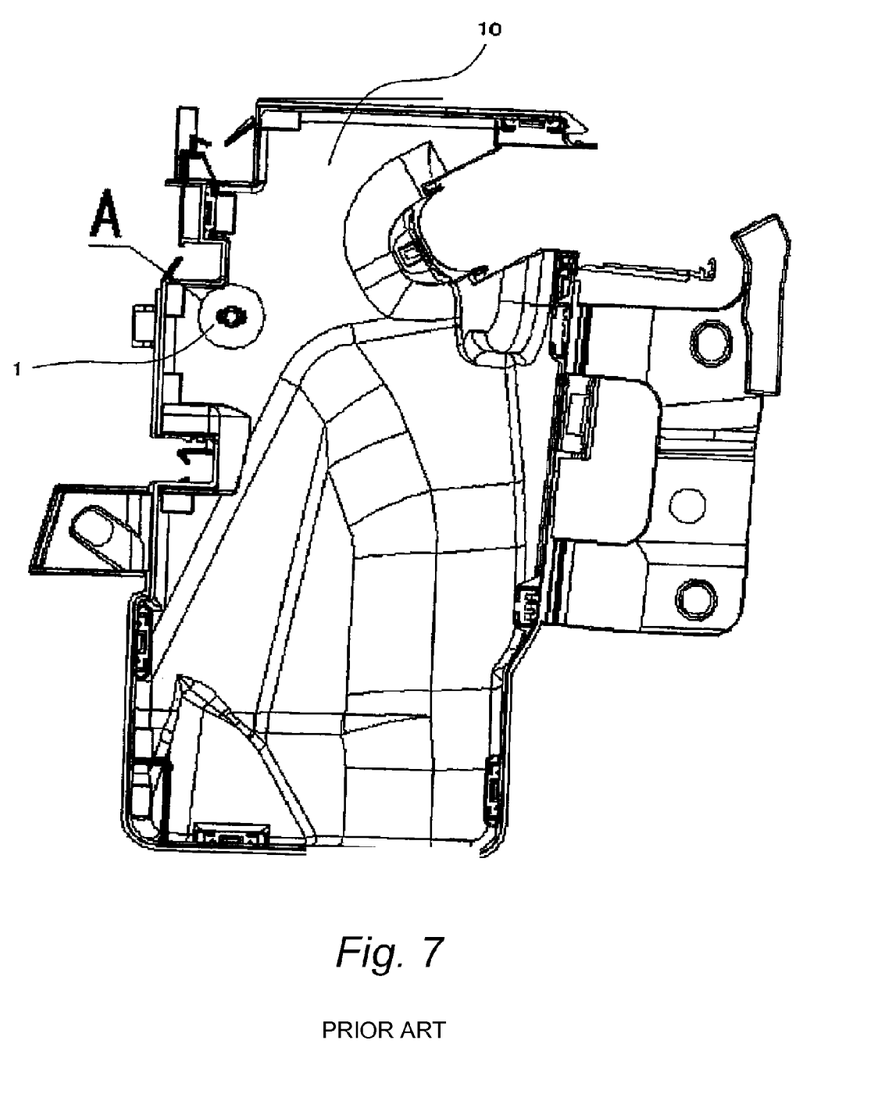
FIG. 7 is a view as seen from the top in FIG. 6, and A indicates a position where a clip is attached to a wall body of a mounting member.
Figure 8:
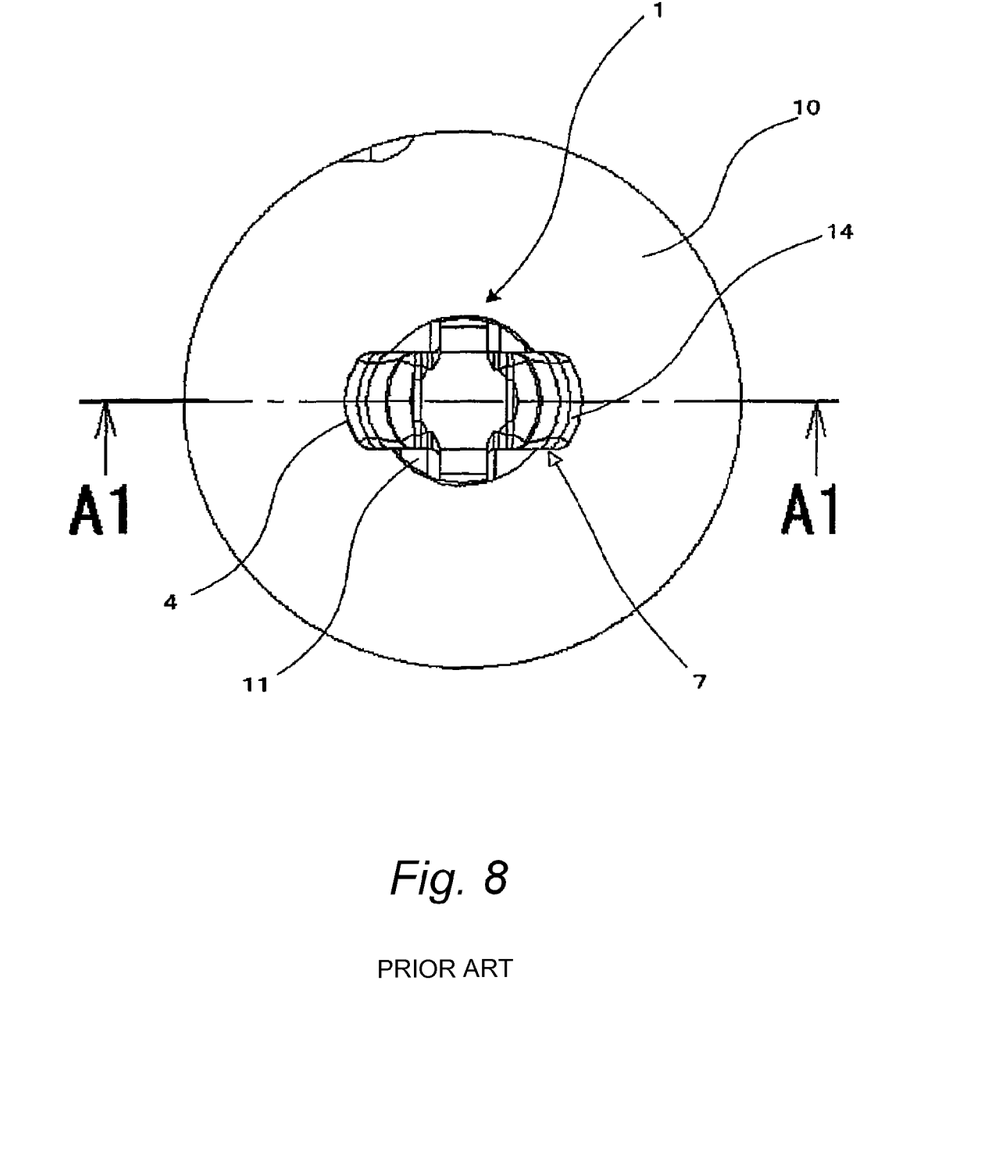
FIG. 8 is an enlarged view of the portion A of FIG. 7.
Figure 9:
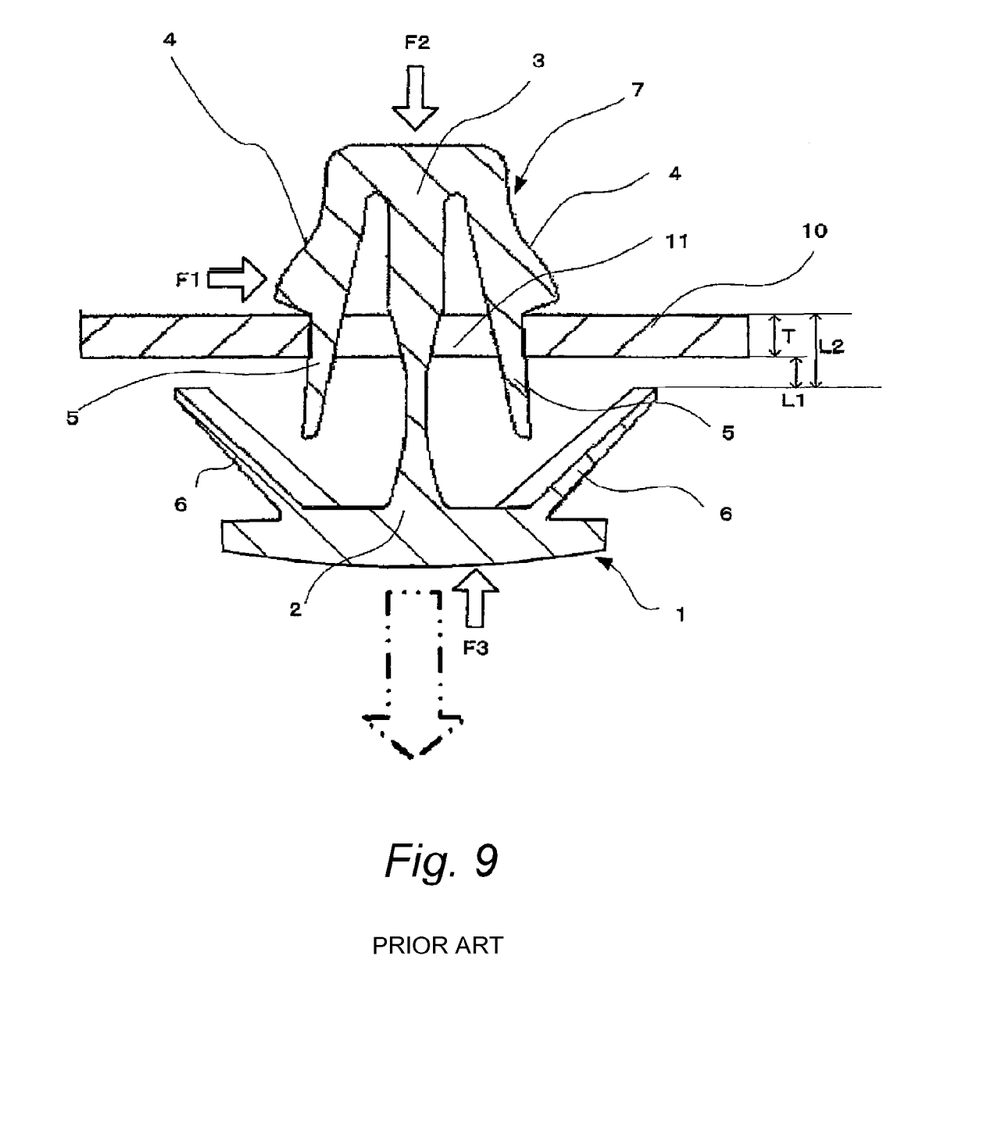
FIG. 9 is a cross-sectional view taken along the line A1-A1 of FIG. 8.

Conventionally, as an attachment structure of a clip for being attached to a wall body of a mounting member such as a protector, a transmission equipment, the interior of a vehicle or others, there is disclosed one in which the attachment is made by fitting elastic retaining pieces in a retaining hole in the wall body (for example, see PTL 1 to 3). FIGS. 6 to 9 are views showing a conventional attachment structure of a clip. FIG. 6 is a perspective view of the attachment structure. FIG. 7 is a plan view as seen from the top in FIG. 6, and A indicates a position where the clip is attached to the wall body of the mounting member. FIG. 8 is an enlarged view of the portion A of FIG. 7. FIG. 9 is a cross-sectional view taken along the line A1-A1 of FIG. 8. The attachment structure of the clip shown in FIGS. 6 to 9 comprises a retaining hole 11 formed in the wall body 10 of the mounting member, and the clip 1 having a retaining head 7 to be inserted in this retaining hole 11. This clip 1 includes a base portion 2 holding an article such as a wire harness or a base portion 2 attached to other equipment body, a clip pillar 3 formed upright on this base portion 2, the retaining head 7 comprising a pair of elastic retaining pieces 4, 4 depending from this clip pillar 3, and a pair of elastically-bendable press-contacting pieces 6 formed on and extending slantingly from the base portion 2.

For attaching the clip 1 of the above construction to the wall body 10 of the mounting member having the above construction, first, the retaining head 7 of the clip 1 is inserted into the retaining hole 11 in the wall body 10 from the outer side of the wall body 10 toward the inner side thereof. Then, the elastic retaining pieces 4 are pressed in a closing direction by an inner peripheral edge of the retaining hole 11 and are deformed, and when the retaining head 7 is further inserted deeper, step retaining portions 5 of the elastic retaining pieces 4 reach an upper end portion of the retaining hole 11, and the elastic retaining pieces 4 are elastically restored in an opening direction, so that the retaining step retaining portions 5 are retained on an open edge portion of the retaining hole 11.

In this manner, the clip 1 is attached to the wall body 10 of the mounting member, and in this condition, when some force F1, F2, F3 was applied to the clip 1 (see FIG. 9), there was a possibility that the portion around the retaining hole 11 was deformed depending on the thickness T and material of the wall body 10 of the mounting member, so that the retaining engagement of the step retaining portions 5 of the elastic retaining pieces 4 with the open edge portion of the retaining hole 11 might be canceled.

In addition, the strength of the wall body 10 of the mounting member was reduced as a result of formation of the retaining hole 11 therein, and therefore this led to the reduction of the strength of a mounting member body.

Furthermore, when some force F1 was applied to the elastic retaining piece 4 of the clip 1 by contact of an electric wire or others in the condition in which the clip was attached to the wall body 10 of the mounting member, there was a possibility that the elastic retaining piece 4 was deformed in the closing direction, so that the retaining engagement of the step retaining portions 5 of the elastic retaining pieces 4 with the open edge portion of the retaining hole 11 might be canceled.

And, in the case of the clip 1 having the press-contacting pieces 6 as shown in FIG. 9, the function of the press-contacting pieces 6, that is, the function of preventing the shaking of the clip 1, can not be efficiently performed if the relation between a length L2 from a retaining surface of the step retaining portion 5 of the elastic retaining piece 4 to a press-contact surface of the press-contacting piece 6 and the thickness T of the wall body 10 of the mounting member is not so determined as to establish $L2 \leq T$, that is, if a clearance L1 is not provided between the press-contact surface of the press-contacting piece 6 and the wall body 10 of the mounting member.

Therefore, in the case of using the clip 1 having the press-contacting pieces 6, the length L2 between the retaining surface of the step retaining portion 5 of the elastic retaining piece 4 and the press-contact surface of the press-contacting piece 6 must be selected according to the thickness T of the wall body 10 of the mounting member, and therefore the range of selection of the clip was narrow.

CITATION LIST

Patent Literature

[PTL 1] JP-A-2005-42770

[PTL 2] JP-A-7-208413

[PTL 3] JP-A-5-164114

SUMMARY OF INVENTION

Technical Problem

The present invention seeks to solve the problems of the above conventional attachment structure of the clip having the elastic retaining pieces, and an object thereof is to provide an attachment structure of a clip in which merely by adding a simple construction to a wall body of a mounting member, deformation of that portion around a retaining hole is eliminated, and the clip can be attached in a stable condition.

Also, it is another object of the present invention to provide an attachment structure of a clip in which merely by adjusting dimensions of the construction to be added to the wall body of the mounting member, the range of selection of the clip to be used can be increased.

Solution to Problem (1) In order to achieve the above object, an attachment structure of a clip according to the present invention is an attachment structure of a clip, a part of the clip being inserted into a retaining hole formed in a wall body from an outer side of the wall body toward an inner side thereof so as to be retained therein, so that the clip is attached to the retaining hole, the attachment structure comprising: an elastic retaining piece that is inserted into the retaining hole while being elastically deformed so as to be retained in the retaining hole, wherein a rib disposed around the retaining hole is formed integrally with the wall body.

(2) Preferably, the rib in the attachment structure described above (1) is a first rib formed on the inner side of the wall body, and the first rib has a thickness that a press-contacting piece of the clip abuts the outer side of the wall body when the elastic retaining piece is inserted in the retaining hole and is retained on the rib.

(3) Preferably, the rib in the attachment structure described above (2) is a second rib formed outside the first rib in concentric with the first rib, and the second rib has a thickness larger than the thickness of the first rib.

(4) Preferably, a height of the second rib in the attachment structure of the clip described above (3) from the wall body is not smaller than a height from the wall body to a retaining head of the clip.

(5) Preferably, a raised portion is formed on the outer side of said wall body integrally with said wall body only at that portion of said wall body in which said retaining hole of the attachment structure of the clip of the above (3) or (4) is formed.

Advantageous Effects of Invention

As is clear from the above description, according to the attachment structure of the clip of the present invention, merely by adding the simple construction to the wall body of the mounting member, deformation of the portion around the retaining hole is eliminated, and the clip can be attached in a stable condition.

Also, merely by adjusting the dimensions of the construction to be added to the wall body of the mounting member, the shaking of the clip can be reduced, and the range of selection of the clip to be used can be increased.

DESCRIPTION OF EMBODIMENTS

Embodiments of the present invention will be described below with reference to the drawings.

Embodiment 1

Construction of Attachment Structure

Figure 1:
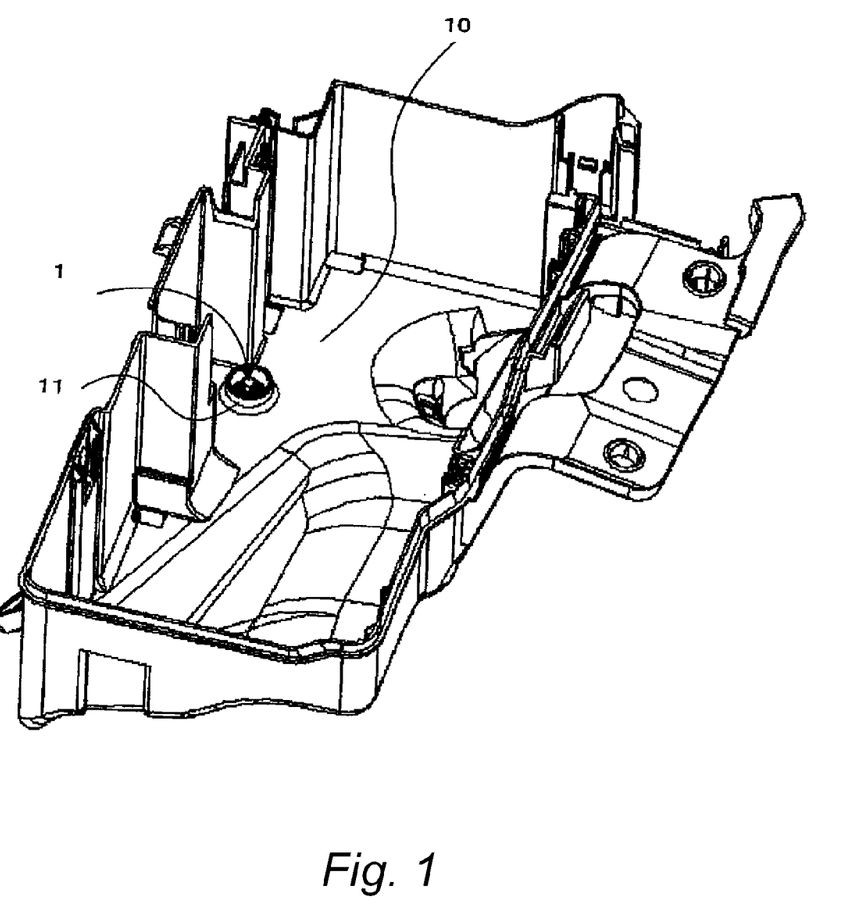
FIG. 1 is a perspective view of an embodiment 1 of an attachment structure of a clip of the present invention.
Figure 2:
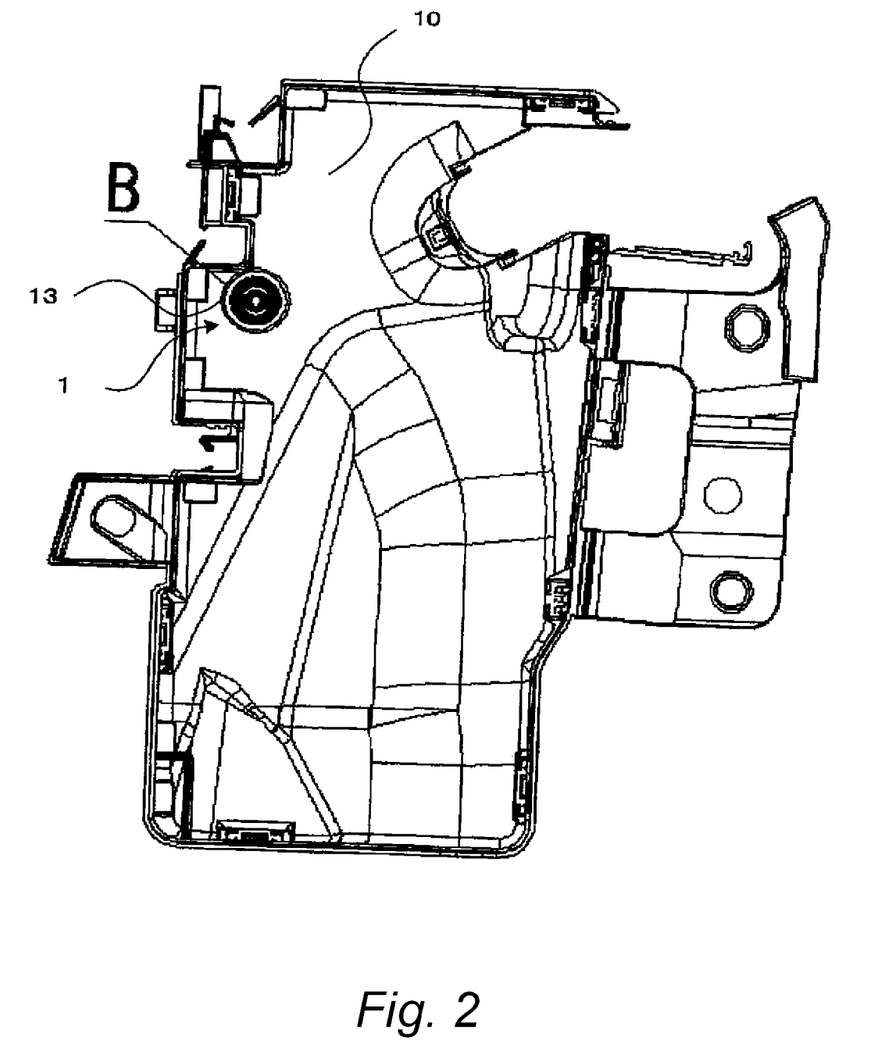
FIG. 2 is a view as seen from the top in FIG. 1, and B indicates a position where the clip is attached to a wall body of a mounting member.

As shown in FIG. 1 and FIG. 2, an attachment structure of a clip according to the present invention comprises a retaining hole 11 formed in a wall body 10 of an electrical equipment serving as a mounting member, and a synthetic resin-made clip 1 having a retaining head for passing through this retaining hole 11.

Figure 3:
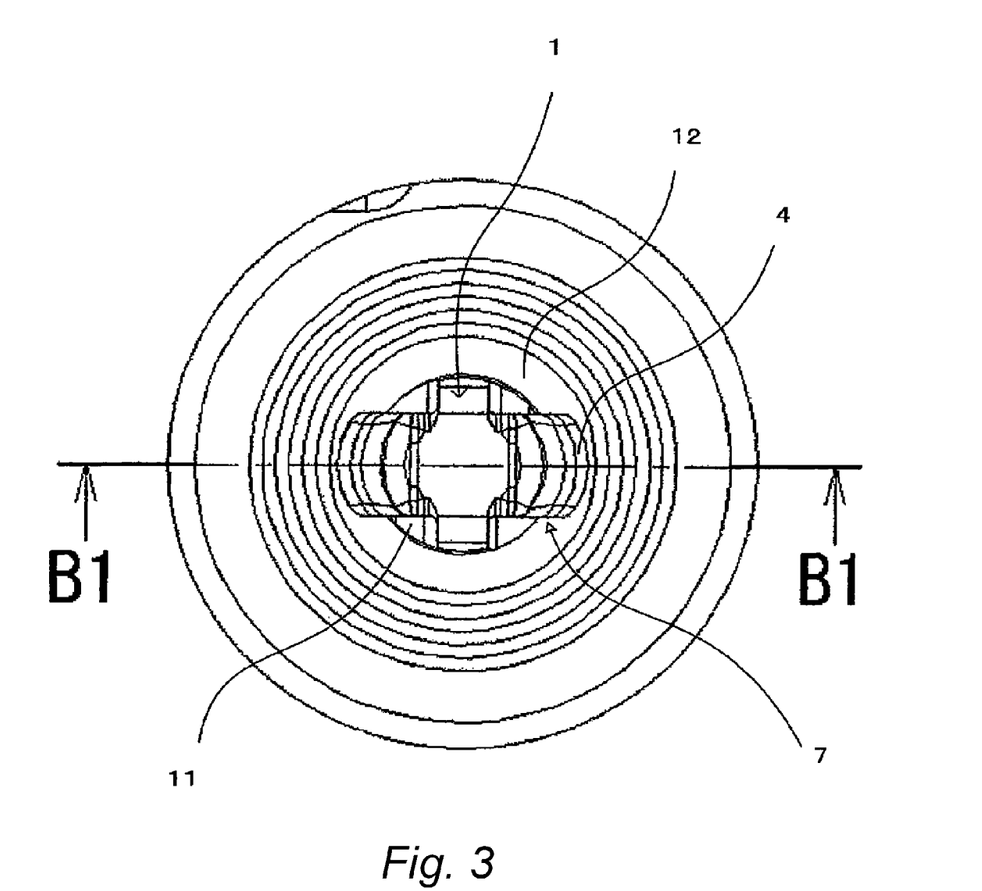
FIG. 3 is an enlarged view of the portion B of FIG. 2.
Figure 4:
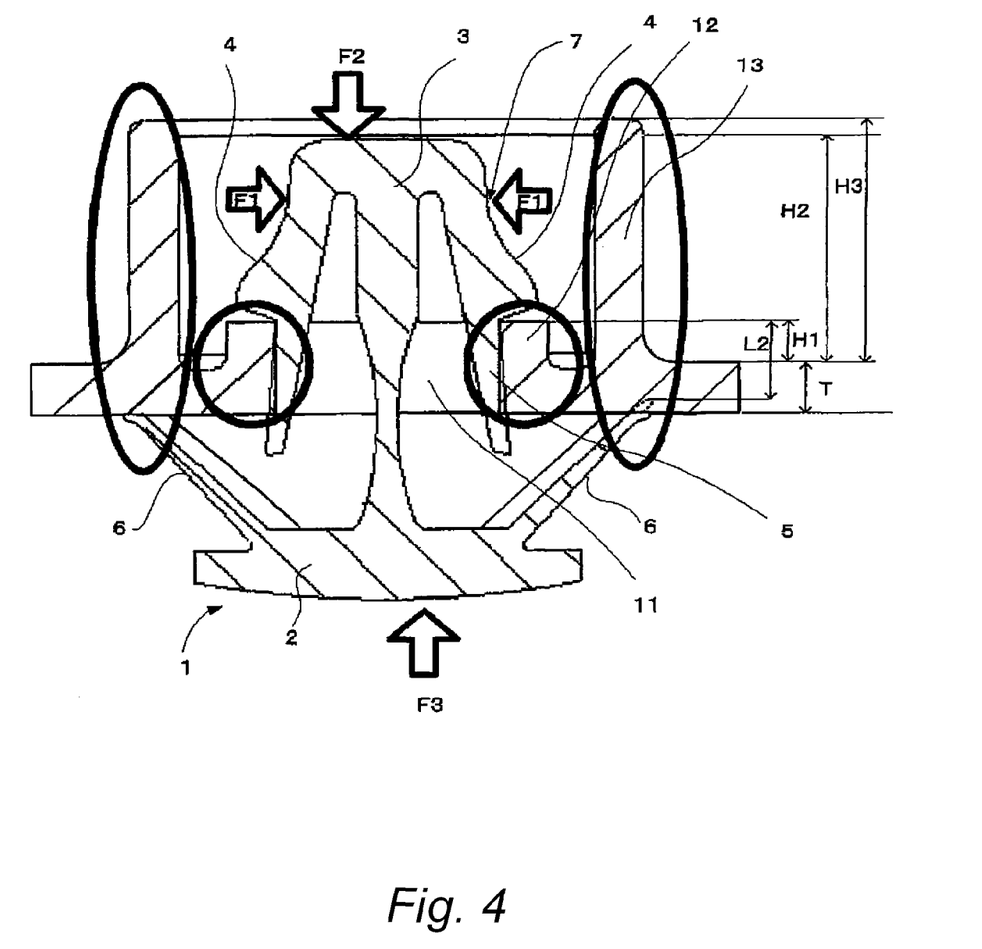
FIG. 4 is a cross-sectional view taken along the line B1-B1 of FIG. 3.

As shown in FIG. 3 and FIG. 4, the wall body 10 includes a first rib 12 formed integrally with the wall body 10 and disposed around the retaining hole 11 in concentric relation to the retaining hole 11, and a second rib 13 formed integrally with the wall body 10 and disposed outside the first rib 12 in concentric relation to the first rib 12 and in surrounding relation to the retaining head 7 passing through this retaining hole 11.

The clip 1 includes a base portion 2 having such a structure that it can hold an article such as a wire harness or a base portion 2 of such a structure as to be attached to other equipment body, a clip pillar 3 formed upright on this base portion 2, and the retaining head 7 comprising a pair of elastic retaining pieces 4, 4 depending from this clip pillar 3.

The clip 1 further includes a pair of elastically-bendable press-contacting pieces 6 formed on and extending slantingly from the base portion 2. As examples of the mounting member on which the clip 1 is mounted, wall bodies of an electrical equipment, such as a protector, a fuse box, a relay box, a joint box and so on, and a vehicle interior are given.

In the present invention, the first rib 12 is formed on the inner side of the wall body 10, and is formed into such a thickness that in a condition in which the clip 1 is inserted in the retaining hole 11, and retaining surfaces of step retaining portions 5 of the elastic retaining pieces 4 are retained on the first rib, the press-contacting pieces 6 of the clip 1 is disposed in an abutting condition relative to the outer side of the wall body 10.

The second rib 13 is formed outside the first rib 12 in concentric relation to the first rib 12, and is formed into a thickness larger than the thickness of the first rib 12, and with respect to its height, the second rib is constructed such that its height from the wall body 10 is not smaller than the height from the wall body 10 to the retaining head 7 of the clip 1.

(Manner of Attaching Clip)

For attaching the clip 1 of the above construction to the wall body 10 of the mounting member having the above construction, first, the retaining head 7 of the clip 1 is inserted into the retaining hole 11 in the wall body 10. Then, the elastic retaining pieces 4 are pressed in a closing direction by an inner peripheral edge of the retaining hole 11 and are deformed, and when the retaining head 7 is further inserted deeper, the step retaining portions 5 of the elastic retaining pieces 4 reach an open edge portion of an upper end portion of the retaining hole 11, that is, an open edge portion of an upper end portion of the first rib 12 formed around the retaining hole 11, and the elastic retaining pieces 4 are elastically restored in an opening direction, so that the retaining step retaining portions 5 are retained on the open edge portion of the upper end portion of the first rib 12. In the condition in which the clip 1 is attached to the wall body 10 of the mounting member, the retaining head 7 of the clip 1 projecting from the retaining hole 11 in the wall body 10 is surrounded by the second rib 13.

In this construction, the first rib 12 is formed at the wall body 10 of the mounting member such that a thickness T of that portion around the retaining hole 11 is increased, and therefore a strength of this portion is increased. Therefore, there will not be encountered a situation as in the conventional example in which when some force F1, F2, F3 is applied (see FIG. 4), the portion around the retaining hole 11 is deformed, and therefore the retaining engagement of the step retaining portions 5 of the elastic retaining pieces 4 with the open edge portion of the retaining hole 11 will not be canceled.

And besides, the wall body 10 of the mounting member itself can cover the reduction of the strength due to the formation of the retaining hole 11 by a reinforcing effect of the first rib 12, and therefore the reduction of the strength of a mounting member body will not be invited.

Furthermore, in the condition in which the clip 1 is attached to the wall body 10 of the mounting member, the second rib 13 formed on the wall body 10 surrounds the retaining head 7 of the clip 1 projecting from the retaining hole 11 in the wall body 10, and the height H3 of the second rib 13 from the wall body 10 is not smaller than the height H2 from the wall body 10 to the retaining head 7 of the clip 1. Therefore, the second rib prevents any other member such as an electric wire from contacting the retaining head 7 of the clip 1 and also from contacting the elastic retaining pieces 4 of the clip 1. Therefore, the elastic retaining pieces 4 will not be deformed in the closing direction, and the retaining engagement of the step retaining portions 5 of the elastic retaining pieces 4 with the open edge portion of the retaining hole 11 will not be canceled.

At the same time, the second rib 13 formed on the wall body 10 is formed integrally with the wall body 10, and therefore reinforces the wall body 10, and it can be said that the second rib has the function of preventing the retaining engagement of the step retaining portions 5 of the elastic retaining pieces 4 with the open edge portion of the retaining hole 11 from being canceled.

In the case of the clip 1 having the press-contacting pieces 6 as shown in FIG. 4, a design is made to increase the thickness T of the portion around the retaining hole 11 according to the size of the clip 1 to be used, thus adjusting the height H1 of the first rib 12, and the relation between a length L2 from the retaining surface of the step retaining portion 5 of the elastic retaining piece 4 to a press-contact surface at the distal end of the press-contacting piece 6 and a value obtained by adding a height H1 of the first rib 12 to the thickness T of the wall body 10 of the mounting member is so adjusted that L2≤T+H1 can be established, that is, by adjustments, there can be created such a relation that a clearance L3 will not be formed between the press-contact surface of the press-contacting piece 6 and the wall body 10 of the mounting member, and therefore this can be conformed to the size of the clip 1 to be used, and the function of preventing the shaking of the clip 1 can be efficiently performed. Therefore, even in the case where the clip 1 having the press-contacting pieces 6 is used, and the thickness T of the wall body 10 of the mounting member is unique, a unique value of the length L2 between the retaining surface of the step retaining portion 5 of the elastic retaining piece 4 and the press-contact surface of the press-contacting piece 6 does not need to be selected according to the unique thickness T of the wall body 10, and therefore the range of selection of the clip is increased.

With respect to the form of the first rib 12 formed around the retaining hole 11, it can be formed integrally with the wall body 10 of the mounting member simultaneously with the formation of the wall body 10, using the same material as the wall body 10. In another case, it can be formed integrally with the wall body 10 of the mounting member simultaneously with the formation of the wall body 10, using a different material from that of the wall body 10. In a further case, separately from the formation of the wall body 10 of the mounting member, one made of either the same material as the wall body 10 or a different material can be formed integrally therewith by an adhesive or others. Also, the shape can be any of various shapes such as an annular shape, a rectangular shape and so on in so far as the purpose can be achieved. In short, if the first rib 12 has such a structure as to provide reinforcement against deformation of the retaining hole 11, this is sufficient.

Incidentally, in the case of efficiently performing the function of the press-contacting pieces 6, that is, the function of preventing the shaking of the clip 1, it is clear that the projection of a predetermined amount need to be provided at that side where the retaining head 7 is disposed.

The first rib 12 is free to be formed on either side of the wall body 10, and the inner side which is the side where the retaining head 7 of the clip 1 is received is preferred, but from the viewpoint of the strength, it may, of course, be formed on the opposite side.

Furthermore, it is more preferred to provide these respectively on both sides (This will be described in the embodiment 2).

The form of the second rib 13 formed around the retaining hole 11 is similar to the form of the first rib 12, and it can be formed integrally with the wall body 10 of the mounting member simultaneously with the formation of the wall body 10, using the same material as the wall body 10. In another case, it can be formed integrally with the wall body 10 of the mounting member simultaneously with the formation of the wall body 10, using a different material from that of the wall body 10. In a further case, separately from the formation of the wall body 10 of the mounting member, one made of either the same material as the wall body 10 or a different material can be formed integrally therewith by an adhesive or others. Also, the shape can be any of various shapes such as an annular shape, a rectangular shape and so on in so far as the purpose can be achieved. In short, if the second rib 13 has such a structure that it can prevent any other member such as an electric wire from contacting the retaining head 7 and the elastic retaining pieces 4 of the clip 1, this is sufficient.

Although it is preferred that the height H3 of the second rib 13 be not smaller than the height H2 of the retaining head 7 of the clip, one lower than the height H2 of the retaining head 7 of the clip can be selected depending on an expected size of an article and an expected magnitude of a force.

As is clear from the above description, in the attachment structure of the clip of the present invention, merely by adding the simple construction to the wall body of the mounting member, deformation of the portion around the retaining hole is eliminated, and the clip can be attached in a stable condition. Also, merely by adjusting the dimensions of the construction to be added to the wall body of the mounting member, the shaking of the clip can be reduced, and the range of selection of the clip to be used can be increased.

Embodiment 2

Figure 5:
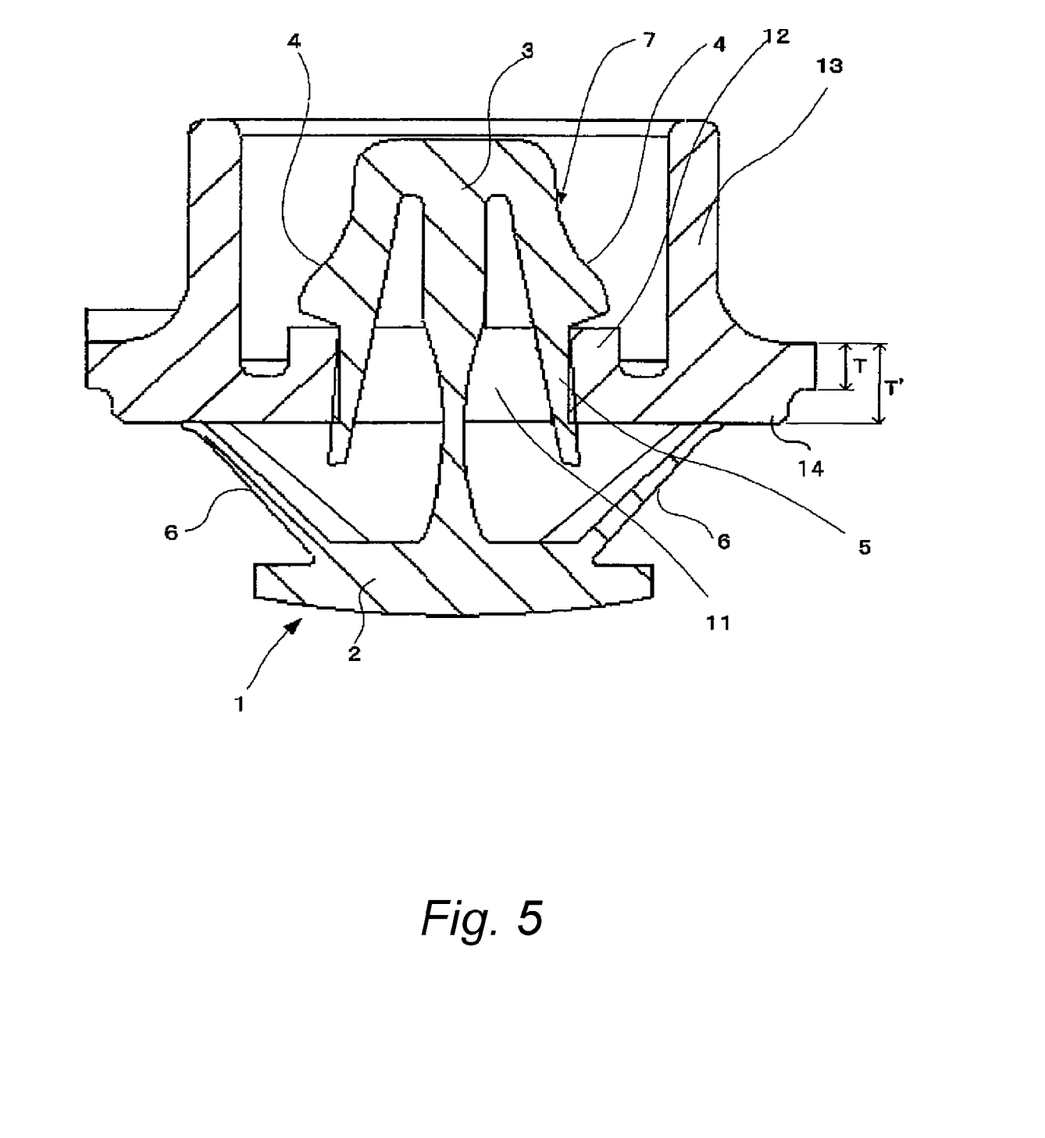
FIG. 5 is a cross-sectional view of an embodiment 2 of an attachment structure of a clip of the present invention.

An attachment structure of a clip according to an embodiment 2 of the present invention will be described with reference to FIG. 5. In FIG. 5, the same reference numerals as in FIG. 4 designate the same members, respectively, and therefore repeated description will be omitted.

The embodiment 2 differs from the embodiment 1 in that although the outer side of the wall body 10 of the electrical equipment serving as the mounting member is flat over the entire area thereof in the embodiment 1, an outer side of a wall body 10 is not flat over an entire area thereof in the embodiment 2, and a raised portion 14 is formed on the opposite face only at that side where a first rib 12 and a second rib 13 are provided, thereby forming a wall thickness of T' as a whole.

Thus, the reinforcement against the reduction of the mechanical strength due to the formation of the retaining hole 11 in the wall body 10 is made by the first rib 12 and the second rib 13 in the embodiment 1, and further the reinforcement is made by the raised portion 14 of T'-T on the opposite face of the wall body 10 in the embodiment 2.

Therefore, in the embodiment 2, also, by the simple construction in which the wall thickness of the wall body is increased only at the portion of the wall body of the mounting member in which the retaining hole 11 is formed, deformation of the portion around the retaining hole is eliminated, and the clip can be attached in the stable condition. Also, merely by adjusting the dimensions of the construction to be added to the wall body of the mounting member, the shaking of the clip can be reduced, and the range of selection of the clip to be used can be increased.

The present Application is based on Japanese Patent Application No. 2008-013064 filed on Jan. 23, 2008, and the contents of which are incorporated herein for reference.

INDUSTRIAL APPLICABILITY

According to the attachment structure of the clip of the present invention, the deformation of the portion around the retaining hole is eliminated, and the clip can be attached in the stable condition, and the range of selection of the clip to be used can be increased.

REFERENCE SIGNS LIST

1 clip
2 base portion
3 clip pillar
4 elastic retaining piece
5 step retaining portion
6 press-contacting piece
7 retaining head
10 wall body
11 retaining hole
12 first rib
13 second rib
14 raised portion

The invention claimed is:

1. An attachment structure for a clip, comprising:
   a mounting member;
   a retaining hole formed in the mounting member, wherein an elastic retaining piece of the clip, while being elastically deformed, is inserted into the retaining hole from an outer side of the mounting member toward an inner side of the mounting member so as to be retained in the retaining hole;
   a rib, disposed around the retaining hole, formed integrally with the mounting member,
   wherein the rib includes:
   a first rib formed on the inner side of the mounting member, and having a thickness such that a press-contacting piece of the clip abuts the outer side of the mounting member when the elastic retaining piece is inserted in the retaining hole and is retained on the rib; and
   a second rib formed outside the first rib and concentric to the first rib, and having a thickness larger than the thickness of the first rib; and
   a raised portion, on the outer side of the mounting member, formed integrally with the mounting member only at a portion of the mounting member where the retaining hole is formed.

2. The attachment structure of a clip as set forth in claim 1, wherein:
   a height of the second rib from the mounting member is not smaller than a height from the mounting member to a retaining head of the clip.

* * * * *